Feb. 25, 1964 MINORU NAGATA 3,121,998

CONSTANT-TEMPERATURE APPARATUS WITH THERMOELECTRIC DEVICE

Filed May 1, 1962

United States Patent Office 3,121,998
Patented Feb. 25, 1964

3,121,998

CONSTANT-TEMPERATURE APPARATUS WITH THERMOELECTRIC DEVICE

Minoru Nagata, Kitatama-gun, Tokyo-to, Japan, assignor to Kabushiki Kaisha Hitachi Seisakusho, Chiyoda-ku, Tokyo-to, Japan, a joint-stock company of Japan Filed May 1, 1962, Ser. No. 191,581
10 Claims. (Cl. 62—3)

This invention relates to a new constant-temperature apparatus of the type wherein, through the use of a thermoelectric element utilizing the so-called Peltier effect, heating or cooling is accomplished, whereby the magnitude and direction of the input current of the said thermoelectric element is controlled in response to the variation of the temperature within a constant-temperature chamber.

Heretofore, as means for controlling the input current of the thermoelectric element in such a constant-temperature apparatus wherein the Peltier effect is utilized, such means as relays and switch circuits or magnetic amplifiers have been proposed. All of these means, however, have such disadvantages as inability to accomplish precise sequential control and incapability of the entire apparatus to be miniaturized to a great degree. Especially for such apparatuses wherein such components as transistors or constant-voltage diodes, the characteristics of which vary with great sensitivity with fluctuations in the ambient temperature, are used, such conventional constant-temperature devices as mentioned above are almost impractical.

It is, therefore, an object of the present invention to provide a constant-temperature apparatus which maintains a stable constant-temperature state by means of a precise temperature-control circuit.

For the attainment of the foregoing object, the present invention, through the use of transistors, accomplishes control of the magnitude and direction (polarity) of the input current of a thermoelectric element.

The nature and principle of the invention, its details, and the manner in which the above-stated object, as well as other objects and advantages as will presently become apparent, may best be achieved will be best understood by reference to the following description when taken in conjunction with the accompanying illustrations in which like parts and values are designated by like reference numerals and letters, and in which.

Figure 1:
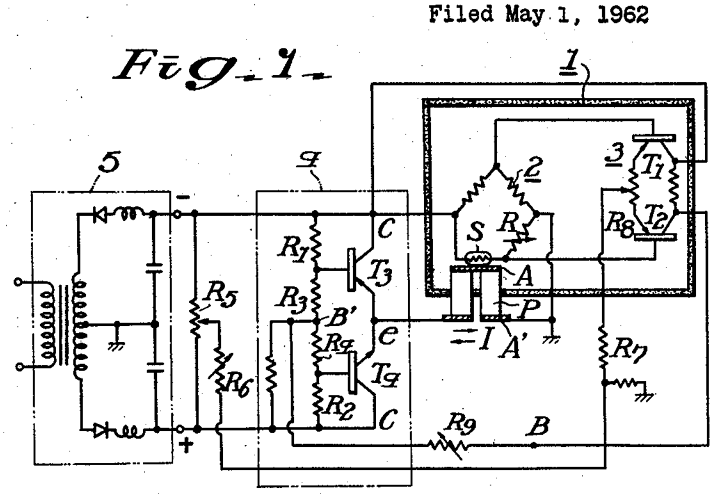
FIG. 1 is an electrical circuit diagram indicating the electrical system of one representative embodiment of the constant-temperature apparatus according to the invention.

Referring to FIG. 1, reference numeral 1 designates a constant-temperature chamber in which are suitably installed an inside junction A of one side of a thermoelectric element P, a temperature detecting bridge 2 one arm of which is a thermistor or other temperature sensing devices S for detecting temperature variations within the said chamber, and a transistor differential amplifier 3 which is formed by transistors $T_1$ and $T_2$ and amplifies the detected output of the detecting bridge 2. A push-pull, transistor amplifying circuit 4, which is composed of transistors $T_3$ (pnp) and $T_4$ (npn) and resistances $R_1$, $R_2$ and $R_3$, $R_4$, is provided to function as a transistor control circuit for controlling the magnitude and direction of the input current to the thermoelectric element P in accordance with the output of the aforesaid amplifier 3. The said circuit 4 is so connected that a direct-current voltage is impressed, by way of the thermoelectric element P, across the emitters *e* and the collectors *c* of these transistors $T_3$ and $T_4$. Power is supplied by a rectifying power supply circuit 5.

It will now be supposed that the detecting bridge 2 is so adapted as to generate a positive (or negative) signal voltage when the temperature within the chamber 1 varies above (or below) a certain temperature $t$ (° C.). When, under this condition, a temperature variation occurs within the chamber, the quantity of the said signal, acting through the transistors $T_1$ and $T_2$ of the transistor differential amplifier 3, causes the potential of the point B′ to vary to positive (or negative). The said signal is imparted to the base of each of the transistors $T_3$ and $T_4$ of the push-pull transistor circuit 4 and controls the potential of their common emitter *e*. As a result, the magnitude and direction of the input current of the thermoelectric element P varies, and the temperature of the inside junction A is maintained at its predetermined value. In order to increase the control capacity for the above operation, such an expedient as inserting an amplifier of necessary degree of amplification between the points B and B′, depending on the necessity, is suitably resorted to.

In this case, the relation between the temperature T of the inside junction A of the thermoelectric element P and the current I flowing therethrough is generally expressed by the following mathematical equation.

$$T=\frac{Q+L\,Ta+\frac{1}{2}RI^2}{2N\eta+L}$$

where:

Q is the quantity of heat absorbed in the inside junction A;
L is heat conductance;
T*a* is the surrounding temperature (temperature outside the chamber);
R is the series resistance of the element material;
N is the number of elements; and
$\eta$ is the thermoelectromotive force.

Then, for the case wherein a suitable thermoelectric material (for example $Bi_2Te_3$), $Q=50$ mw. $L=7.4\times1.0^{-3}$ w./° C. $Ta=300$ ° K. $R=104.$ mΩ $N=1$, and $2N\eta=2\eta=350\mu v.$ the relation between the current I and the temperature T is as represented graphically in FIG. 2. In this graph, the symbol ΔT represents the difference between the minimum temperature $T_0$ obtained at the contact A and the surrounding temperature T*a* (300° K. in this case), that is, the maximum temperature drop.

Figure 2:
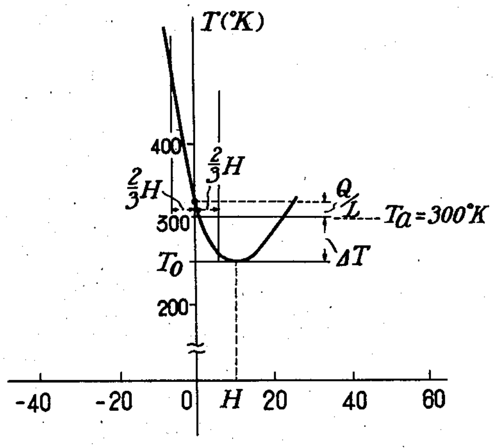
FIG. 2 is a graphical representation showing the relation between the inside junction temperature and the current of a thermoelectric element.

It will be apparent that, with such a characteristic as represented in FIG. 2, by using the portion where the slope of the curve is great, the coefficient of proportionality, that is, the gain, is greater than that in the case in which another portion is used. At the same time, with such a control system as this, it is desirable to effect control over a wide range with as low a current as possible.

This is particularly important in the case of transistors since the electric power which they can handle is limited.

In view of these considerations, the apparatus according to this invention is so designed that control is accomplished within the range wherein the temperature of the inside junction A of the thermoelectric element is substantially proportional to the driving current, that is, within a current range of a magnitude which is approximately two-thirds of the current H producing the maximum temperature $\Delta T$ in the thermoelectric element. The setting of the temperature within the chamber is accomplished by adjusting the variable resistance R of the bridge 2 or the variable resistance $R_8$ which effects the bias of the transistor amplification circuit 3.

A fluctuation in the power supply voltage also causes a great variation in the temperature within the chamber. It has been determined through experiments that a fluctuation of 10 percent in the voltage on the negative side causes a variation of approximately 0.5° C. in the temperature within the chamber. It is for this reason that, in the apparatus illustrated in FIG. 1, a compensation circuit consisting of resistances $R_5$, $R_6$, and $R_7$ which compensate for fluctuations of the power supply voltage is added with respect to the transistor differential amplification circuit. In this case, compensation of fluctuation of the power supply voltage can be also attained by impressing a part of said voltage on the intermediate portion of the amplifier circuit.

Furthermore, since fluctuations in the characteristics due to temperature changes are made small by using the detecting bridge and at least the initial stage of the amplification circuit for the output signal as a transistor differential circuit, and, moreover, since these circuits are installed within the constant-temperature chamber, the temperatures of these circuits are also stabilized, wherefore the stability of the temperature within the chamber is greatly increased. However, in certain cases in which precise control is not particularly needed or setting of temperature in the chamber is made to be variable, the elements of the bridge 2 other than the thermistor S and the above-mentioned transistor differential circuit may be installed outside of the chamber.

Figure 3:
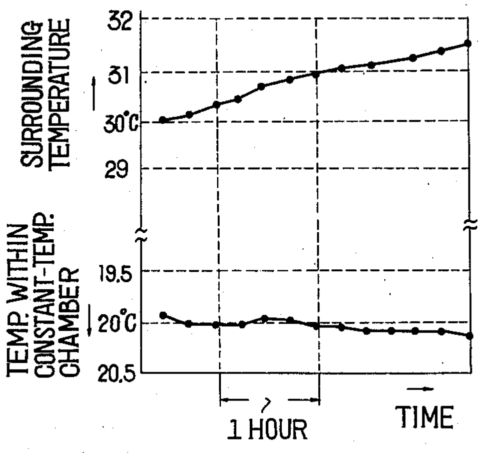
FIG. 3 is a graphical representation showing specific constant-temperature characteristic curves of an apparatus according to the invention.

The characteristics of the above-described apparatus may be illustrated in a specific manner by the example curves shown in FIG. 3, which indicate that stable thermostaticity is obtained. The result indicated in FIG. 3 is that for the case wherein the temperature control is set so as to maintain the temperature within the constant-temperature chamber at 20° C.

Figure 4:
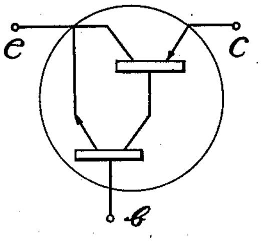
FIG. 4 is a schematic diagram indicating a combined transistor circuit suitable for use in the apparatus of the invention.

Since the npn-type transistors available at present for the control transistor $T_4$ in the circuit shown in FIG. 1 are not suitable for large currents, the use of a combined arrangement as shown in FIG. 4 is preferable. Since the transistors operate at low voltage and high current, by using these transistors to drive the thermoelectric element as in this invention, good results are obtained, and precise, continuous temperature control becomes possible.

Figure 5:
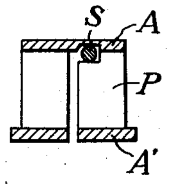
FIGS. 5 and 5A are elevational views, in diagrammatic forms, showing the installations of a temperature-sensitive element.
Figure 5A:
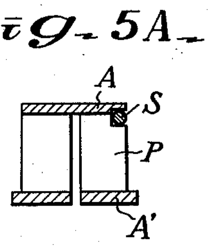

By further modifications, as will be described below, of the temperature detecting circuit 2 in the constant-temperature apparatus according to the present invention as described above, even better thermostatic control becomes possible. In the first modification, as indicated in FIG. 5 and 5A, a temperature-sensitive element S (for example: a thermistor) is placed in direct and intimate contact with the connecting part between the thermoelectric element P and the inside junction A, that is, the boundary surface where the Peltier effect occurs. In this case, it is preferable to form the temperature-sensitive element as long as possible so as to obtain a large contact area at the abovesaid boundary surface. By this construction, it becomes possible to detect the temperature of the point where the temperature variation is most rapid. Accordingly, it is possible to reduce to an extreme degree such factors at time constant and phase lag in this part. As a total effect, high-precision, high-speed control becomes easy.

In another modification, the closed-loop gain G of this constant-temperature apparatus is caused to be constant over a wide temperature range through an improvement of the aforesaid temperature detecting circuit. That is, by denoting the transfer function of temperature-to-voltage (or current) of the temperature detecting circuit 2 by $G_b$, the transfer function of the differential amplification circuit 3 of the initial stage of the transistor amplification circuit and the push-pull transistor control circuit 4 by $G_a$, and the transfer function of the current-to-temperature of the thermoelectric device P by $G_p$, the loop gain G of this control closed loop may be expressed as $$G=G_b\times G_a\times G_p$$

In order to attain stable and excellent temperature control, it is desirable that the above-stated loop gain G be constant, as well as large, over a wide temperature range. With this in mind, a study of each of the above transfer functions $G_b$, $G_a$, and $G_p$ produces the following findings. First, the transfer function $G_a$ can be made constant over a wide temperature range by suitably designing the transistor amplifier. Next, if, as indicated in FIG. 1, a thermistor is used as the temperature-sensitive element S in the temperature detecting circuit 2, and the temperature within the chamber is set by a variable resistance R, the transfer function $G_b$ can be made substantially constant over a wide temperature range (for example: a range of the order of several tens of degrees centigrade with the room temperature as a central value). However, the function $G_p$ varies greatly with temperature. That is, since the heating and cooling characteristic of the thermoelectric device P varies as a second degree function with the current I passed therethrough, as indicated in FIG. 2, and since the function $G_p$ is produced as the slope of this characteristic curve, the absolute value of the function $G_p$ decreases with increase of the current I. To mention one example, with a set temperature difference of 30° C., the ratio of the function $G_p$ has a range of the order of 1 to 10.

As will be apparent from the above considerations, the loop gain G varies widely with variation of the function $G_p$, whereby the design of a stable control system becomes extremely difficult. Particularly, when the set temperature is high, hunting readily occurs in the control system.

Figure 6:
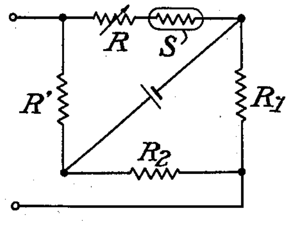
FIG. 6 is a electrical circuit diagram showing a modification of a temperature detecting bridge.
Figure 7:
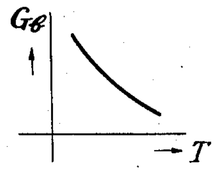
FIG. 7 is a graphical representation indicating the relation between the temperature-to-voltage transfer function of a temperature detecting circuit and the set temperature.

The present invention provides a remedial measure by predetermining the transfer function $G_b$ of the temperature detecting circuit so as to cancel the variation of the transfer function $G_p$ of the thermoelectric device with respect to temperature, thereby causing the product of the aforesaid two functions to be substantially constant over a wide temperature range. More specifically, by inserting a temperature-setting, variable resistance R in series with the thermistor as shown in FIG. 6, and satisfying the relation $R_2(S+R)=R_1R'$, balance is achieved. By this expedient, when the set temperature T is high, the value of the thermistor S is low; accordingly, the resistance R is determined to be high. Thus, the gain $G_b$ of this detecting circuit is caused to decrease with increase of the set temperature, as indicated in FIG. 7. That is, the characteristic of the gain $G_b$ is the opposite of that of the function $G_p$, whereby it is possible to maintain the product $G_p\times G_b$ substantially constant. Accordingly, the loop gain $G=G_a\times G_p\times G_b$ can be caused to be substantially constant, irrespective of the set temperature, and an extremely stable temperature-controlling system can be easily obtained.

Furthermore, through the use of a temperature detecting bridge circuit as shown in FIG. 6, the design of the transistor amplification circuit is greatly facilitated since the output impedance of the bridge becomes almost constant. This is in marked contrast to the case of the conventional temperature detecting circuit such as the circuit 2 shown in FIG. 1, the impedance of which exhibits a variation of approximately two times with respect to a temperature variation of 30° C. Moreover, since the variable resistance R is inserted in series with the thermistor S in the case shown in FIG. 6, stability with respect to the shorting of the thermistor S is provided.

While the above-described arrangement is that of the case wherein the temperature detecting circuit 2 is so designed that the variation of the function $G_b$ becomes opposite to the variation of the function $G_p$ in order to cause the gain G to be constant, it is also possible to cause the gain G to be substantially constant by controlling the gain $G_a$ of the transistor amplifiers 3 and 4 to vary oppositely with respect to the gain $G_p$, with the function $G_b$ maintained in a constant state. It will be apparent that, for example, in the circuit of FIG. 1, it is possible to set the temperature within the chamber by adjusting the temperature setting resistance R of the temperature detecting circuit 2 and, at the same time, cause the gain G to be constant in the same manner as in the case wherein the function $G_b$ is varied by adjusting the gain adjusting resistance (for example: $R_9$) of the transistor amplifier 3 in accordance with the said temperature so set.

Since it is obvious that many changes and modifications can be made in the above-described details without departing from the nature and spirit of the invention, it is to be understood that the invention is not to be limited to the details described herein except as set forth in the appended claims.

What is claimed is:

1. A constant-temperature apparatus with a thermoelectric device, comprising a constant-temperature structure, a thermoelectric element having the Peltier effect, a temperature detecting device for detecting the temperature within the said structure, the contact on one side of the said element and the said device being installed within the said structure, a temperature compensated transistor amplification circuit such as differential circuit which, in its at least initial stage, amplifies the output of the said temperature detecting device, a transistor circuit which is connected in series with the said thermoelectric element and is driven by the amplified output of the said differential amplification circuit, and a power supply system; a variable resistance controlling the bias of said transistor amplification circuit; the said transistor circuit by said variable resistance being capable of controlling the inflow current of the said thermoelectric element, in accordance with the said amplified output of the said differential amplification circuit, in such a manner as to cause the temperature within the said structure to coincide with a predetermined, set value, and, at the same time, the range of fluctuation of the inflow current of the said thermoelectric element being so predetermined that its absolute value is within approximately two-thirds of the current value producing the maximum temperature drop in the said thermoelectric element.

2. A constant-temperature apparatus according to claim 1 wherein the temperature detecting device and the transistor differential amplification circuit are disposed within the constant-temperature structure.

3. A constant-temperature apparatus according to claim 1 wherein a temperature detecting element is fixed in intimate contact with one portion of the boundary contact surface between the thermoelectric element installed within the constant-temperature structure and the electrode.

4. A constant-temperature apparatus according to claim 1 wherein at least one of the temperature detecting circuit and the transistor amplification circuit is so adapted as to cause the variation of the transfer function of at least one of the temperature detecting circuit and the transistor amplification circuit with respect to the variation of the set temperature to be opposite to the variation of the transfer function of the thermoelectric element with respect to the said temperature, thereby causing the product of the aforesaid three transfer functions to be substantially constant.

5. A constant-temperature apparatus according to claim 4 wherein the temperature detecting device consists of a bridge in one arm of which a temperature-sensitive element and a variable resistance for setting the temperature are connected in series.

6. A constant-temperature apparatus according to claim 1 wherein a push-pull circuit having a single ended output and obtained by assembling npn-type and pnp-type transistors in such manner that the collector of the npn transistor is connected to the base of the pnp transistor and the emitter of the npn transistor is connected to the collector of the pnp transistor is used to carry out control by changing polarity of current of the thermoelectric element to (+) or (−).

7. A constant temperature apparatus with a thermoelectric device, comprising a constant-temperature structure, a thermoelectric element having the Peltier effect; a temperature detecting device for detecting the temperature within said structure, the contact on one side of said element and the said device being installed in said structure; a temperature-compensated transistor amplification circuit such as a differential circuit which, at least in its initial stage, amplifies the output of said temperature detecting device; a transistor circuit for control which is a push-pull circuit formed by connecting a first transistor and a second transistor in series; said thermoelectric element being connected at the junction point of said first transistor and said second transistor; and said push-pull circuit being driven by the amplified output of said amplification circuit; and a power supply system; said transistor circuit being adapted to control the inflow current of said thermoelectric element in accordance with the amplified output of said differential amplification circuit, in such a manner as to cause the temperature within said structure to coincide with a predetermined set value.

8. The constant temperature apparatus according to claim 7, wherein said push-pull circuit consists of a pnp-type transistor as said first transistor and npn-type transistor as said second transistor.

9. The constant temperature apparatus according to claim 7, wherein the voltage of the direct current power source applied to said push-pull circuit is selected in such a manner that the allowable maximum value of the current being caused to flow in the thermoelectric element through the push-pull circuit is maintained at less than the current capable of effecting a maximum temperature drop.

10. The constant temperature apparatus according to claim 7, wherein the voltage of the direct current power source applied to said push-pull circuit is selected in such a manner that the maximum allowable value of the current caused to flow in the thermoelectric element through the push-pull circuit is maintained at less than two thirds of the current effecting a maximum temperature drop.

References Cited in the file of this patent

UNITED STATES PATENTS

| | | |
|---|---|---|
| 2,751,549 | Chase | June 19, 1956 |
| 3,031,855 | Martz | May 1, 1962 |